US010798710B1

(12) United States Patent  
Narendran et al.

(10) Patent No.: US 10,798,710 B1  
(45) Date of Patent: Oct. 6, 2020

(54) SELECTION OF PRIMARY CARRIER BASED ON USAGE TYPE

(71) Applicant: Sprint Spectrum LP, Overland Park, KS (US)

(72) Inventors: Rajveen Narendran, Olathe, KS (US); Sreekar Marupaduga, Overland Park, KS (US); Andy Wurtenberger, Olathe, KS (US); Bryan Barbee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 87 days.

(21) Appl. No.: 15/800,556

(22) Filed: Nov. 1, 2017

(51) Int. Cl.
| | |
|---|---|
| *H04W 72/12* | (2009.01) |
| *H04W 4/70* | (2018.01) |
| *H04W 12/08* | (2009.01) |
| *H04W 24/02* | (2009.01) |
| *H04W 72/04* | (2009.01) |

(52) U.S. Cl.
CPC ..... *H04W 72/048* (2013.01); *H04W 72/0453* (2013.01); *H04W 72/042* (2013.01)

(58) Field of Classification Search
CPC ... H04W 36/30; H04W 72/0453; H04W 4/10; H04W 12/08; H04W 16/32; H04W 12/0808; H04W 4/70; H04W 72/12; H04W 24/02; G06Q 50/01; H04M 15/00
USPC .............. 370/335, 328; 715/765, 736; 726/1
See application file for complete search history.

(56) References Cited

U.S. PATENT DOCUMENTS

| | | | | |
|---|---|---|---|---|
| 8,364,540 | B2 * | 1/2013 | Soroca | G06Q 30/02 |
| | | | | 705/14.64 |
| 8,893,009 | B2 * | 11/2014 | Raleigh | H04M 15/00 |
| | | | | 715/736 |
| 8,908,649 | B2 | 12/2014 | Xue et al. | |
| 9,058,406 | B2 * | 6/2015 | Soroca | G06Q 30/0247 |
| 9,392,462 | B2 * | 7/2016 | Raleigh | H04W 12/08 |
| 9,503,247 | B2 | 11/2016 | Panchal | |
| 9,781,540 | B2 * | 10/2017 | Jagannathan | G06Q 50/01 |
| 9,942,820 | B2 * | 4/2018 | Zhang | H04W 36/30 |
| 9,973,930 | B2 * | 5/2018 | Raleigh | H04L 63/20 |
| 10,070,339 | B2 * | 9/2018 | Chhabra | H04B 7/0689 |
| 10,237,758 | B2 * | 3/2019 | Venkatraman | H04W 4/70 |
| 2010/0094878 | A1 * | 4/2010 | Soroca | G06Q 30/02 |
| | | | | 707/748 |
| 2012/0140743 | A1 * | 6/2012 | Pelletier | H04W 72/0453 |
| | | | | 370/335 |
| 2012/0221955 | A1 * | 8/2012 | Raleigh | H04L 12/1485 |
| | | | | 715/736 |
| 2013/0014040 | A1 * | 1/2013 | Jagannathan | H04M 1/72586 |
| | | | | 715/765 |

(Continued)

*Primary Examiner* — William D Cumming

(57) ABSTRACT

Systems, methods, and processing nodes for performing carrier aggregation in a wireless network include associating a primary usage type of an application running on a wireless device with a characteristic of a first carrier based on at least a first frequency band utilized by the first carrier, associating a secondary usage type of the application with a characteristic of a second carrier based on at least a second frequency band utilized by the second carrier, assigning the first carrier as a primary carrier for the wireless device when operating in a carrier aggregation mode, and assigning the second carrier as a secondary carrier for the wireless device when operating in the carrier aggregation mode.

19 Claims, 5 Drawing Sheets

(56) References Cited

U.S. PATENT DOCUMENTS

| | | | | |
|---|---|---|---|---|
| 2013/0055097 | A1* | 2/2013 | Soroca | G06F 16/9577 |
| | | | | 715/738 |
| 2013/0304581 | A1* | 11/2013 | Soroca | G06Q 30/0267 |
| | | | | 705/14.64 |
| 2015/0023253 | A1* | 1/2015 | Takahashi | H04L 5/001 |
| | | | | 370/328 |
| 2015/0143456 | A1* | 5/2015 | Raleigh | H04W 12/0808 |
| | | | | 726/1 |
| 2016/0242194 | A1* | 8/2016 | Mitola | H04W 72/12 |
| 2016/0359661 | A1* | 12/2016 | Chhabra | H04B 7/0689 |
| 2017/0078886 | A1* | 3/2017 | Raleigh | H04W 12/0808 |
| 2017/0353815 | A1* | 12/2017 | Jagannathan | H04M 1/72525 |
| 2018/0206133 | A1* | 7/2018 | Venkatraman | H04W 24/02 |
| 2019/0132736 | A1* | 5/2019 | Raleigh | H04L 63/20 |
| 2019/0166510 | A1* | 5/2019 | Venkatraman | H04L 47/29 |

* cited by examiner

US 10,798,710 B1

SELECTION OF PRIMARY CARRIER BASED ON USAGE TYPE

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement carrier aggregation, i.e. enabling wireless devices and access nodes to communicate using a combination of carriers, i.e. component carriers. However, carriers utilizing different frequencies or operating in different frequency bands tend to have different characteristics, such as throughput and propagation. Further, different types of wireless devices may execute different applications that change a usage type of a wireless device. Thus, selection of component carriers for wireless devices can be a challenge, and current methods do not adequately consider the various usage types of wireless devices and characteristics of the component carriers.

OVERVIEW

Exemplary embodiments described herein include systems, methods, and processing nodes for performing carrier aggregation based on a usage type of an application on a wireless device. An exemplary system for performing carrier aggregation in a wireless network includes a processing node, and a processor communicably coupled to the processing node, the processor for enabling the processing node to perform operations comprising identifying a usage type of an application operating on a wireless device, and correlating the usage type with a carrier based on a characteristic of the carrier. The characteristic comprises one of a large coverage area or a high throughput. The operations further include instructing the wireless device to operate in a carrier aggregation mode utilizing the carrier as a primary carrier.

An exemplary method described herein for performing carrier aggregation in a wireless network includes associating a usage type of an application on a wireless device with a carrier deployed by an access node in the wireless network. The association is based on a frequency band utilized by the carrier. The method further includes combining resources from the carrier with at least one other carrier for communications between the wireless device and the access node.

An exemplary processing node described herein for performing carrier aggregation in a wireless network is configured to perform operations comprising associating a primary usage type of an application running on a wireless device with a characteristic of a first carrier based on at least a first frequency band utilized by the first carrier, associating a secondary usage type of the application with a characteristic of a second carrier based on at least a second frequency band utilized by the second carrier, assigning the first carrier as a primary carrier for the wireless device when operating in a carrier aggregation mode, and assigning the second carrier as a secondary carrier for the wireless device when operating in the carrier aggregation mode.

DETAILED DESCRIPTION

Figure 1:
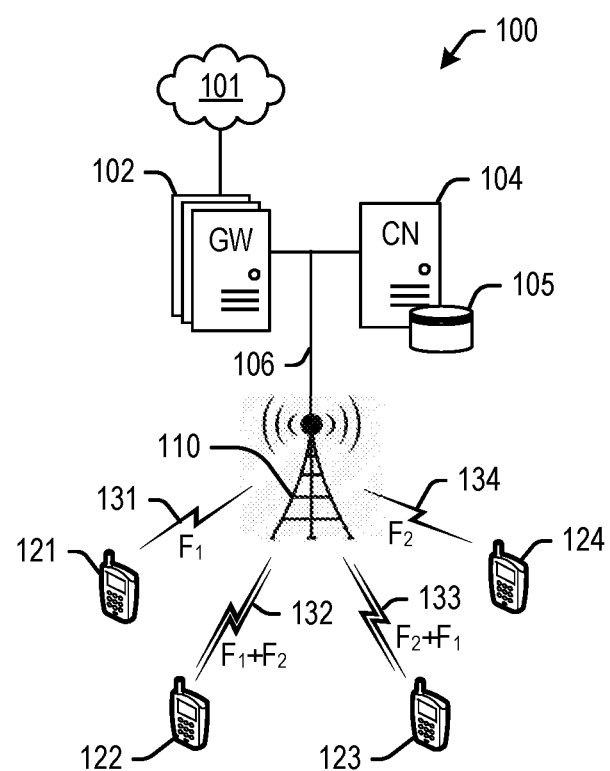
FIG. 1 depicts an exemplary system for selection of a primary carrier based on usage type.

Operations described herein include selection of a primary carrier for a carrier aggregation mode of operation of a wireless device based on a correlation between a usage type of an application on the wireless device and a characteristic of the primary carrier. For example, applications with certain usage types may be correlated or associated with a carrier that provides a large coverage area. Such applications may include, for instance, voice over IP (VoIP), navigation or location-based services, or other applications that, when executed, indicate to the wireless network that the wireless device has a high mobility, and may require coverage over a large area. Such applications may further include applications utilizing requiring a low quality of service (QoS). Carriers that utilize lower frequencies may be known by the operator of the wireless network to have better propagation characteristics over large distances. Thus, such low-frequency carriers are correlated with these usage types. Similarly, other applications with different usage types may be correlated or associated with a carrier that provides a high throughput. Such applications may include, for instance, multimedia streaming, gaming, or other applications that, when executed, indicate to the wireless network that the wireless device requires a high throughput, and/or may have a low mobility. Such applications may further include applications utilizing a high QoS. Carriers that utilize higher frequencies may be known by the operator of the wireless network to provide a higher throughput than low-frequency carriers. Thus, such high-frequency carriers are correlated with these other usage types.

Consequently, operations described herein include identifying a usage type of an application operating on a wireless device, correlating the usage type with a carrier based on a characteristic of the carrier, and instructing the wireless device to operate in a carrier aggregation mode utilizing the carrier as a primary carrier. As described herein, the characteristic may include one of a large coverage area or a high throughput. Given that low frequency carriers have better propagation characteristics and high-frequency carriers have higher throughputs, a plurality of carriers, each utilizing a range of frequencies (herein referred to as a frequency band, frequency sub-band, or simply "band"), may be ranked on a spectrum between these two characteristics. Further, a threshold frequency may be defined by a network operator, and carriers utilizing frequencies below the threshold frequency may be classified as providing a large coverage area, while carriers utilizing frequencies above the threshold frequency may be classified as providing a high throughput. Other factors may be utilized by a network operator to classify carriers based on these characteristics, including using network statistics and other information. The primary carrier and the one or more secondary carriers may be selected from among a plurality of carriers deployed by one or more access nodes within the wireless network. In exemplary embodiments depicted herein, an access node deploys at least two carriers, one of which is classified as a low-frequency carrier (or a carrier having the characteristic of a large coverage area), and the other carrier classified as a high-frequency carrier (or a carrier having the characteristic of a high throughput).

Thus, upon determining a usage type of an application running on the wireless device, one or both of the wireless device and the access node are instructed to operate in the carrier aggregation mode utilizing the one carrier as the primary carrier, and the other carrier as the secondary carrier. In other words, resources from the one carrier and the other carrier are combined to enable communications between the wireless device and the access node. Further, the usage type of the application running on the wireless device may be identified based on an indicator received from the wireless device. In an exemplary embodiment, the indicator comprises an attach request. For example, the wireless device may be requesting a connection to the access node, either for the first time, or upon resuming from an idle state. In additional exemplary embodiments, the indicator may include an application identifier of the application running on the wireless device.

In further embodiments described herein, the wireless device attached (or requesting a connection) to the access node may be configured to relay communications between the access node and a second wireless device. For example, the second wireless device may be communicatively coupled to the wireless device, either via an air interface deployed by the wireless device, or via a second access node (such as a small access node) communicatively coupled to the wireless device. In either case, upon determining that the wireless device is configured as a relay for the second wireless device, a primary carrier may be selected for the relay wireless device. In an exemplary embodiment, determining that the wireless device is acting as a relay may be based on an application indicator received from the second wireless device via the relay wireless device. For example, a usage type of an application running on the second wireless device may indicate that the second wireless device requires a high throughput. Thus, a high frequency carrier may be assigned as a primary carrier for the relay wireless device. In another exemplary embodiment, the primary carrier may be selected based on an indicator from the relay wireless device that the relay wireless device is functioning as a relay. For example, upon determining that a wireless device is functioning as a relay, a high-frequency carrier may be assigned as a primary carrier for the relay wireless device based on a preference for relay wireless devices to be provided with a high throughput, thereby enabling relaying of data to several additional wireless devices that attach to the relay wireless device. In another exemplary embodiment, a mobility of a relay wireless device may be used as a factor in selection of a primary carrier. For example, while a stationary relay may be assigned a high-frequency carrier based on the assumption that it will relay services to numerous wireless devices attached thereto, a mobile relay may be assigned a low-frequency carrier based on the assumption that it will require a large coverage area to reliably relay services to other wireless devices attached thereto.

In addition to the systems described herein, these operations may further be implemented as computer-readable instructions or methods, and processing nodes on the network for executing the instructions or methods. For example, a processing node coupled to an access node may be configured to perform the operations described herein. These and other embodiments are further described herein and with reference to FIGS. 1-6.

FIG. 1 depicts an exemplary system for performing carrier aggregation based on control channel load levels. System 100 comprises a communication network 101, gateway 102, controller node 104, access node 110, and wireless devices 121, 122, 123, 124. In this exemplary embodiment, access node 110 may be a macrocell access node configured to deploy one or more carriers utilizing a first frequency $F_1$ and a second frequency $F_2$. Frequencies $F_1$ and $F_2$ may be any frequency band, or plurality of frequencies within a band. For example, frequency $F_1$ may be one of a first plurality of frequencies, or frequency blocks, that occupy a first frequency band at or near 2.5 GHz, while frequency $F_2$ may be one of a second plurality of frequencies, or frequency blocks, that comprise a second frequency band at or near 750 MHz. Furthermore, carriers on frequencies $F_1$ and $F_2$ may be deployed using different types of duplexing modes. For example, carriers utilizing frequency $F_1$ (or other frequencies occupying the first frequency band) may be deployed by access node 110 utilizing a time division duplexing (TDD) mode, and carriers utilizing frequency $F_2$ (or other frequencies occupying the second frequency band) may be deployed by access node 110 utilizing a frequency division duplexing (FDD) mode. Within an exemplary long-term evolution (LTE) system, a first type of carrier may include a FDD-LTE carrier, and a second type of carrier may include a TDD-LTE carrier. In other embodiments, any other combination of macrocell access nodes, small cell access nodes, and carriers or frequency bands deployed therefrom may be evident to those having ordinary skill in the art in light of this disclosure.

Further, by virtue of the frequency (or band) occupied by a carrier, a radio air interface deployed on the carrier may have different propagation and throughput characteristics than another radio interface deployed by another carrier operating within a different frequency or band. As described herein, the characteristic may include one of a large coverage area or a high throughput. Given that low frequency carriers have better propagation characteristics and high-frequency carriers have higher throughputs, a plurality of carriers, each utilizing a range of frequencies (herein referred to as a frequency band or sub-band), may be ranked on a spectrum between these two characteristics. Further, a threshold frequency may be defined by a network operator, and carriers utilizing frequencies below the threshold frequency may be classified as providing a large coverage area, while carriers utilizing frequencies above the threshold frequency may be classified as providing a high throughput. Other factors may be utilized by a network operator to classify carriers based on these characteristics, including using network statistics and other information.

Further, as described herein, wireless devices that are being used for different applications and located at different locations, such as wireless devices 121-124, may benefit from communicating across a combination of carriers based on these propagation and throughput characteristics. Thus, a processing node within system 100 (for example, a processing node communicatively coupled to access node 110 but not shown herein) may be configured to select a primary carrier for wireless devices 121-124 based on a device type, usage type, location, and other factors. The device type may include a relay wireless device, a high-powered wireless device, a standard (or low) powered device, a carrier-aggregation capable wireless device, a low-priority wireless device (such as an internet-of-things device), etc. A device type may be identified based on a unique identifier associated with the wireless device, such as an international mobile equipment identity (IMEI) or other identifier. A device type may further be identified based on a capabilities message received at access node 110 from one or more of wireless devices 121-124. For example, upon being turned on or resuming from idle, each of wireless devices 121-124 may transmit an attach request to access node 110. The attach request includes a user equipment (UE) capability information, including a capability of the respective wireless device to operate in the carrier aggregation mode. In other embodiments, the UE capability information may be separately submitted to access node 110 in response to a capability inquiry. Based on the capability information, access node 110 can identify or determine which wireless devices are capable of carrier aggregation. For example, only wireless devices 122 and 123 may be identified as being capable of carrier aggregation and, therefore, may be configured to operate in the carrier aggregation mode using combined carriers 132 and 133. The usage type may further be inferred from or associated with a device type. For example, a capability of a wireless device to function as a relay, or to transmit at a high power level (i.e. high-powered wireless device), may be identified in the device capabilities information or other method, and the usage associated therewith. The usage type may further be identified based on an application identifier, packet identifier, deep packet inspection, QCI, or other indicator that identifies an application running on the wireless device. In an embodiment, an application requirement may be obtained from a quality of service (QoS) requirement, which can include one or more service conditions for a wireless transmission, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. For example, where an application of one of wireless devices 121-124 comprises streaming video, the application requirements for the wireless device may comprise a minimum bit rate, a maximum permitted delay, a maximum error rate, and any other suitable application requirement.

As described herein, a usage type of the application or application requirement may be correlated with a carrier based on a characteristic of the carrier. For example, applications with certain usage types may be correlated or associated with a carrier that provides a large coverage area. Such applications may include, for instance, voice over IP (VoIP), navigation or location-based services, or other applications that, when executed, indicate to the wireless network that the wireless device has a high mobility, and may require coverage over a large area. Such applications may further include applications utilizing a low QoS, QCI, etc. Carriers that utilize lower frequencies may be known by the operator of system 100 to have better propagation characteristics over large distances. Thus, such low-frequency carriers are correlated with these usage types. Similarly, other applications with different usage types may be correlated or associated with a carrier that provides a high throughput. Such applications may include, for instance, multimedia streaming, gaming, or other applications that, when executed, indicate to the wireless network that the wireless device requires a high throughput, and/or may have a low mobility. Such applications may further include applications utilizing a high QoS. Carriers that utilize higher frequencies may be known by the operator of system 100 to provide a higher throughput than low-frequency carriers. Thus, such high-frequency carriers are correlated with these other usage types.

Upon determining a usage type of an application running on wireless devices 121-124 and obtaining a carrier aggregation capability thereof, a carrier aggregation mode may be initiated for communication between one or more of wireless devices 121-124 and access node 110. The carrier aggregation mode enables multiplexing of data utilizing both carriers $F_1$ and $F_2$ as component carriers, thereby benefitting from the characteristics of each component carrier as needed. For example, a carrier with a large coverage area may be configured as a primary component carrier (or "primary carrier"), while a carrier with a high throughput may be configured as a secondary component carrier (or "secondary carrier"). Such a combination may be useful for a wireless device with a high mobility, or using a VoIP application that does not require a high throughput but may require a large coverage area to ensure a consistent user experience. For example, if wireless device 122 is utilizing the VoIP application, and carrier $F_1$ is a carrier associated with a high coverage area, then communication link 132 utilizes carrier $F_1$ as the primary carrier, and carrier $F_2$ as the secondary carrier. In another example, a carrier with a high throughput may be configured as a primary carrier while a carrier with a large coverage area may be configured as a secondary carrier. Such a combination may be useful for a wireless device with a low mobility but a high throughput requirement, such as gaming or video streaming while at home. For example, if wireless device 123 is utilizing a gaming application, then communication link 133 utilizes carrier $F_2$ as the primary carrier, and carrier $F_1$ as the secondary carrier. Further, although component carriers $F_1$ and $F_2$ are identified in combination, other combinations may be possible in system 100, including $F_1+F_1$, and $F_2+F_2$. In additional embodiments, configurations including more than one carrier may be considered, such as $F_1+F_2+F_2$, and so on. In these instances, the first-identified carrier is the primary carrier, while the remaining carriers are all secondary carriers.

Access node 110 can be any network node configured to provide communication between wireless devices 121-124 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Access node 110 can comprise a processor and associated circuitry to execute or direct the execution of computer-readable instructions to perform operations such as those further described herein with respect to FIG. 2. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown), using a wireless link or a wired link such as an X2 link.

Wireless devices 121-124 may be any device, system, combination of devices, or other such communication platform capable of communicating wirelessly with access node 110 using one or more frequency bands deployed therefrom. Each of wireless devices 121-124 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121-124. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as carriers deployed by access node 110 and characteristics thereof, device capabilities of wireless devices 121-124, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
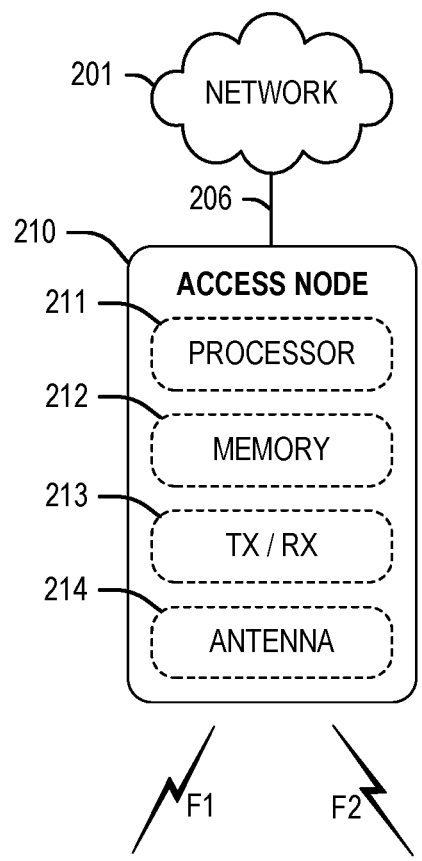
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with wireless devices and relay nodes. Instructions stored on memory 212 can include deploying carriers $F_1$ and $F_2$, enabling wireless devices and relay nodes to attach thereto and access network services from network 201. Access node 210 may further be configured to select of a primary carrier for a carrier aggregation mode of operation of a wireless device based on a correlation between a usage type of an application on the wireless device and a characteristic of the primary carrier. For example, instructions stored on memory 212 may include identifying a usage type of an application operating on a wireless device, correlating the usage type with a carrier based on a characteristic of the carrier, and instructing the wireless device to operate in a carrier aggregation mode utilizing the carrier as a primary carrier.

Figure 3:
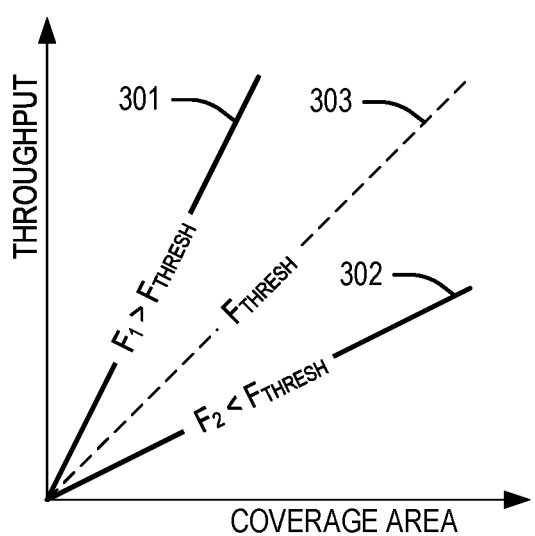
FIG. 3 depicts exemplary characteristics of carriers deployed within a wireless network.

FIG. 3 depicts exemplary characteristics of carriers deployed within a wireless network. As described herein, by virtue of the frequency (or band) occupied by a carrier, a radio air interface deployed on the carrier may have different propagation and throughput characteristics than another radio interface deployed by another carrier operating within a different frequency or band. For example, a characteristic may include one of a large coverage area or a high throughput. Given that low frequency carriers have better propagation characteristics and high-frequency carriers have higher throughputs, a plurality of carriers, each utilizing a range of frequencies (herein referred to as a frequency band or sub-band), may be ranked on a spectrum between these two characteristics. With reference to FIG. 3, a first line 301 depicts how an increased transmit power of carrier $F_1$ increases the throughput significantly, while only slightly increasing the coverage area. Thus, carrier $F_1$ may be considered a high frequency carrier. Meanwhile, a second line 302 depicts how an increased transmit power of carrier $F_2$ increases the throughput slightly, while increasing the coverage area significantly. Thus, carrier $F_2$ may be considered a low frequency carrier. Further, a threshold frequency $F_{thresh}$ (represented by dashed line 303) may be defined by a network operator, and carriers utilizing frequencies below the threshold frequency (such as carrier $F_2$) may be classified as providing a large coverage area, while carriers utilizing frequencies above the threshold frequency (such as carrier $F_1$) may be classified as providing a high throughput. Other factors may be utilized by a network operator to classify carriers based on these characteristics, including using network statistics and other information.

Figure 4:
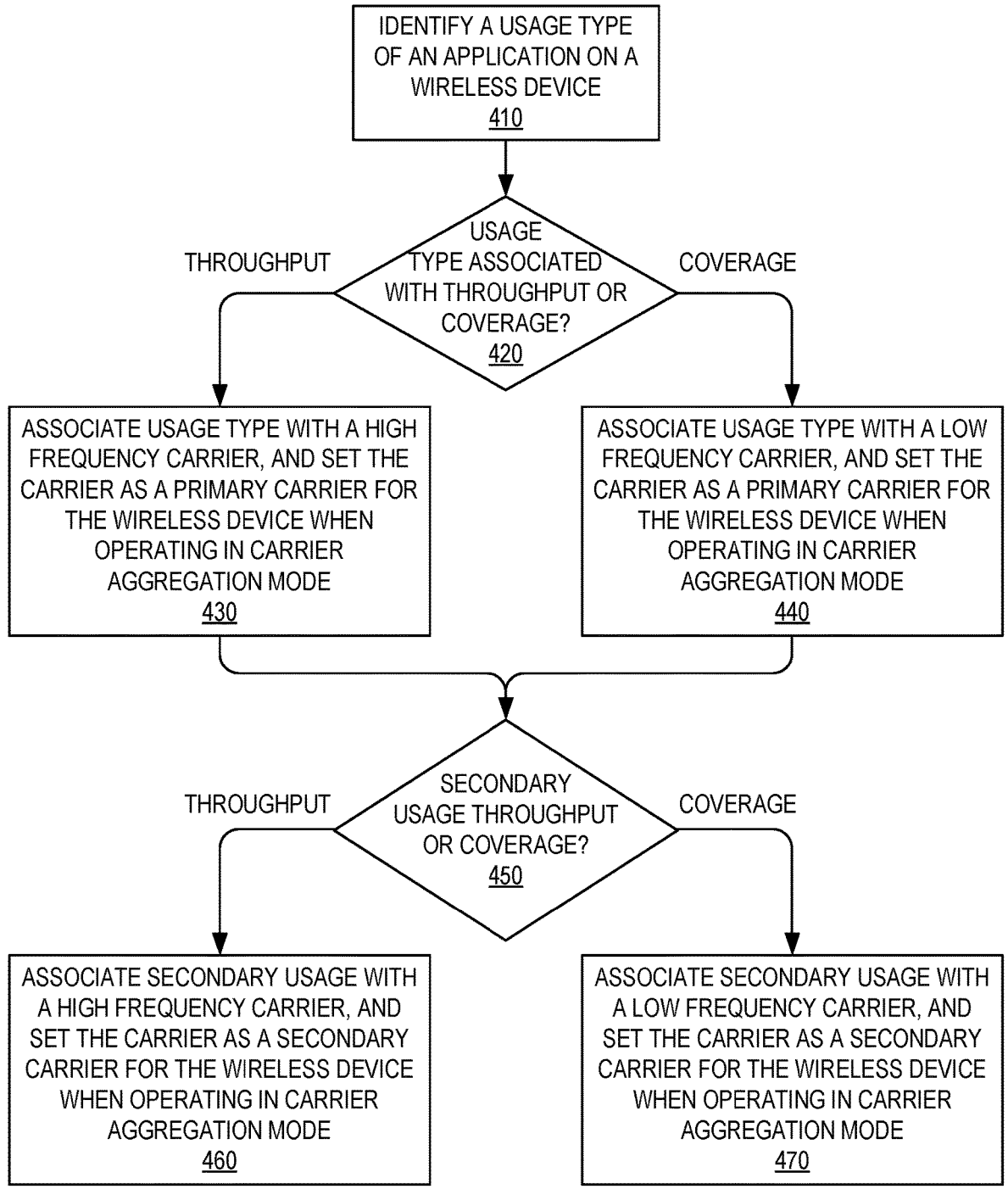
FIG. 4 depicts an exemplary method for selection of a primary carrier based on usage type.

FIG. 4 depicts an exemplary method for selection of a primary carrier based on usage type. The method of FIG. 4 may be implemented by a processing node coupled to an access node (such as access node 110), a controller node (such as controller node 104), or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a usage type is identified for an application running on a wireless device. The usage type may be based on any combination of a device type, application requirement, historical trends, or other indicator received from the wireless device. The device type may include a relay wireless device, a high-powered wireless device, a standard (or low) powered device, a carrier-aggregation capable wireless device, a low-priority wireless device (such as an internet-of-things device), etc. A device type may be identified based on a unique identifier associated with the wireless device, such as an international mobile equipment identity (IMEI) or other identifier. A device type may further be identified based on a capabilities message received at an access node from the wireless device. For example, upon being turned on or resuming from idle, a wireless device may transmit an attach request to the access node. The attach request includes a user equipment (UE) capability information, including a capability of the respective wireless device to operate in the carrier aggregation mode. In other embodiments, the UE capability information may be separately submitted to the access node in response to a capability inquiry. Based on the capability information, the access node can identify or determine which wireless devices are capable of carrier aggregation. The usage type may further be inferred from or associated with a device type. For example, a capability of a wireless device to function as a relay, or to transmit at a high power level (i.e. high-powered wireless device), may be identified in the device capabilities information or other method, and the usage associated therewith. The usage type may further be identified based on an application identifier, packet identifier, deep packet inspection, QCI, or other indicator that identifies an application running on the wireless device. In an embodiment, an application requirement may be obtained from a QoS requirement, which can include one or more service conditions for a wireless transmission, such as a QCI, a minimum GBR, MBR, a priority, a minimum bit rate, a maximum permitted data delay, a minimum throughput, a maximum error rate, a maximum data loss rate, and any other application requirement. For example, where an application of the wireless device comprises streaming video, the application requirements for the wireless device may comprise a minimum bit rate, a maximum permitted delay, a maximum error rate, and any other suitable application requirement.

At 420, the usage type is associated with one of a high throughput or a large coverage area. For example, applications with certain usage types may be correlated or associated with a carrier that provides a large coverage area. Such applications may include, for instance, voice over IP (VoIP), navigation or location-based services, or other applications that, when executed, indicate to the wireless network that the wireless device has a high mobility, and may require coverage over a large area. Such applications may further include applications utilizing requiring a low quality of service (QoS). Carriers that utilize lower frequencies may be known by the operator of the wireless network to have better propagation characteristics over large distances. Thus, such low-frequency carriers are correlated with these usage types. Similarly, other applications with different usage types may be correlated or associated with a carrier that provides a high throughput. Such applications may include, for instance, multimedia streaming, gaming, or other applications that, when executed, indicate to the wireless network that the wireless device requires a high throughput, and/or may have a low mobility. Such applications may further include applications utilizing a high QoS. Carriers that utilize higher frequencies may be known by the operator of the wireless network to provide a higher throughput than low-frequency carriers. Thus, such high-frequency carriers are correlated with these other usage types.

If, at 420, the usage type is correlated with a high throughput then, at 430, a high frequency carrier is set as the primary carrier for the wireless device for a carrier aggregation mode. For example, the primary carrier and the one or more secondary carriers may be selected from among a plurality of carriers deployed by one or more access nodes within the wireless network. In exemplary embodiments depicted herein, an access node deploys at least two carriers, one of which is classified as a low-frequency carrier (or a carrier having the characteristic of a large coverage area), and the other carrier classified as a high-frequency carrier (or a carrier having the characteristic of a high throughput). Given that low frequency carriers have better propagation characteristics and high-frequency carriers have higher throughputs, a high frequency carrier may be selected as a primary carrier for the wireless device at 430, and the wireless device and the access node are instructed to operate in the carrier aggregation mode utilizing the high-frequency carrier as the primary carrier.

However, if at 420, the usage type is correlated with a large coverage area then, at 440, a low frequency carrier is set as the primary carrier for the wireless device for a carrier aggregation mode. Given that low frequency carriers have better propagation characteristics and high-frequency carriers have higher throughputs, a low frequency carrier may be selected as a primary carrier for the wireless device at 430, and the wireless device and the access node are instructed to operate in the carrier aggregation mode utilizing the low-frequency carrier as the primary carrier.

Optionally, at 450, a secondary usage is identified for the wireless device. The secondary usage may be different from the usage type identified at 420, or may be different. For example, a wireless device executing an application with a usage type requiring a high throughput, such as gaming, may also have a high mobility, by virtue of a location determination of the wireless device. While such a wireless device would necessarily require a high throughput, this wireless device may also require a large coverage area to ensure a seamless user experience for a traveling user. Thus, a secondary carrier associated with a large coverage area (i.e. a low frequency carrier) may be selected at 470. Alternatively, the wireless device may be stationary, such that the secondary usage is maintained as the same as the usage type identified at 420. Thus, a secondary carrier associated with a high throughput (i.e. a high frequency carrier) is selected as the secondary carrier at 460. In another example, a wireless device executing an application with a usage type requiring a large coverage area, such as VoIP, may also be streaming live video synced with the voice data. While such a wireless device may require a large coverage area to ensure a seamless user experience for a VoIP user and wouldn't normally require a high throughput, the addition of video streaming necessitates a high throughput requirement. Thus, a secondary carrier associated with a high throughput (i.e. a high frequency carrier) may be selected at 460. Alternatively, the wireless device may have a high mobility (i.e., moving across various geographical locations), such that the secondary usage is maintained as the same as the usage type identified at 420. Thus, a secondary carrier associated with a large coverage area (i.e. a low frequency carrier) is selected as the secondary carrier at 470. Further, in embodiments where option 450 is not selected or is not available, a network operator may instead prefer to set the secondary carrier as a different carrier than the primary carrier, or the same as the primary carrier.

Figure 5:
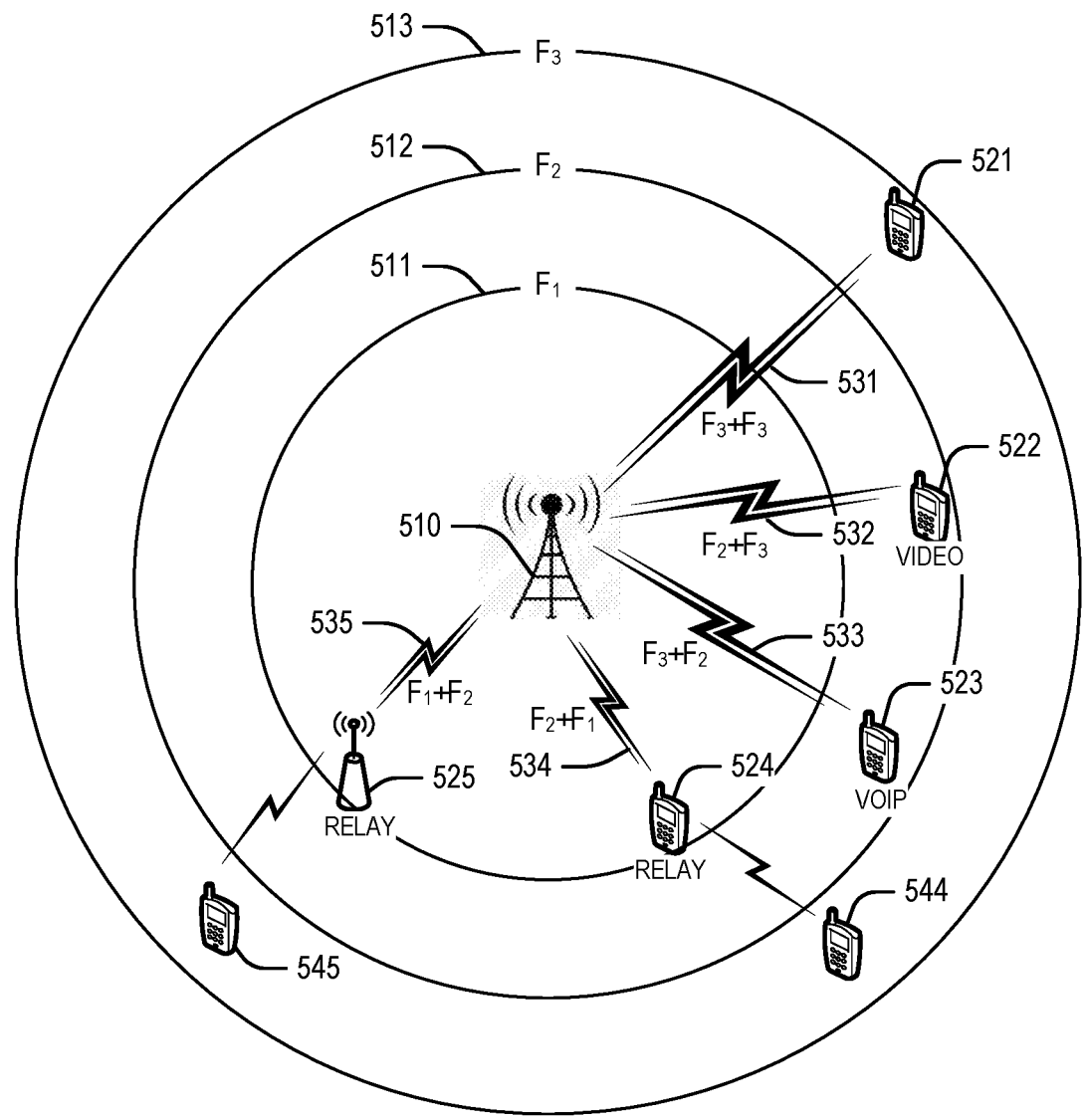
FIG. 5 depicts exemplary selections of primary and secondary carriers for a plurality of different usage types.

FIG. 5 depicts exemplary selections of primary and secondary carriers for a plurality of different usage types. In this exemplary embodiment, access node 510 may be configured to deploy at least three carriers utilizing a first frequency $F_1$, a second frequency $F_2$, and a third frequency $F_3$. Access node 510 can be any network node configured to provide communication between wireless devices 521-525 and communication network 101, including standard access nodes such as a macro-cell access node, base transceiver station, a radio base station, an eNodeB device, an enhanced eNodeB device, or the like. Frequencies $F_1$, $F_2$, and $F_3$ may be any frequency band, or plurality of frequencies within a band. For example, frequency $F_1$ may be one of a first plurality of frequencies, or frequency blocks, that occupy a first frequency band at or near 2.5 GHz, frequency $F_2$ may be one of a second plurality of frequencies, or frequency blocks, that occupy a second frequency band at or near 1.8 GHz, and frequency $F_3$ may be one of a third plurality of frequencies, or frequency blocks, that occupy a third frequency band at or near 750 MHz. Further, by virtue of the frequency (or band) occupied by a carrier, a radio air interface deployed on the carrier may have different propagation and throughput characteristics than another radio interface deployed by another carrier operating within a different frequency or band. As described herein, the characteristic may include one of a large coverage area or a high throughput, and low frequency carriers have better propagation characteristics and high-frequency carriers have higher throughputs. Thus, carrier utilizing high frequency $F_1$ (hereinafter, "carrier $F_1$") may have a smaller coverage area 511 and a high throughput, carrier utilizing lower frequency $F_2$ (hereinafter, "carrier $F_2$") may have a larger coverage area 512 and a medium throughput, and carrier utilizing lowest frequency $F_3$ (hereinafter, "carrier $F_3$") may have the largest coverage area 513 and the lowest throughput. Other factors may be utilized by a network operator to classify carriers based on these characteristics, including using network statistics and other information.

Further, each of wireless devices 521-525 may be of different types and may be executing different applications, thereby affecting their usage types. Thus, each of wireless devices 521-525, may benefit from communicating across a combination of carriers based on these propagation and throughput characteristics. The device type may include a relay wireless device, a high-powered wireless device, a standard (or low) powered device, a carrier-aggregation capable wireless device, a low-priority wireless device (such as an internet-of-things device), etc. A device type may be identified based on a unique identifier associated with the wireless device, such as an international mobile equipment identity (IMEI) or other identifier. A device type may further be identified based on a capabilities message received at access node 510 from one or more of wireless devices 521-525. For example, upon being turned on or resuming from idle, each of wireless devices 521-525 may transmit an attach request to access node 510. The attach request includes a user equipment (UE) capability information, including a capability of the respective wireless device to operate in the carrier aggregation mode. In other embodiments, the UE capability information may be separately submitted to access node 510 in response to a capability inquiry. Based on the capability information, access node 510 can identify or determine which wireless devices are capable of carrier aggregation. The usage type may further be inferred from or associated with a device type. For example, a capability of a wireless device to function as a relay, or to transmit at a high power level (i.e. high-powered wireless device), may be identified in the device capabilities information or other method, and the usage associated therewith. The usage type may further be identified based on an application identifier, packet identifier, deep packet inspection, QCI, or other indicator that identifies an application running on the wireless device. In an embodiment, an application requirement may be obtained from a quality of service (QoS) requirement, which can include one or more service conditions for a wireless transmission, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement.

For the purposes of the present embodiment, each of wireless devices 521-525 is assumed to be capable of carrier aggregation. Further, the usage type of the wireless device or application requirement may be correlated with a carrier based on a characteristic of the carrier. Upon determining a usage type of an application running on wireless devices 521-525 a carrier aggregation mode may be initiated for communication between one or more of wireless devices 521-525 and access node 510. The carrier aggregation mode enables multiplexing of data utilizing combinations of carriers $F_1$, $F_2$, and $F_3$ as component carriers, thereby benefitting from the characteristics of each component carrier as needed. For example, wireless device 521 may be a standard wireless device that can only access carrier $F_3$, owing to its location at the cell edge of access node 510. Thus, wireless device 521 may be configured to utilize one or more component carriers or subcarriers 531 in frequency $F_3$, i.e. carrier $F_3+F_3$, particularly since wireless device 521 cannot access any other carrier. On the other hand, a usage type of wireless device 522 is based on wireless device 522 being engaged in a video stream. Further, wireless device 522 is located within coverage areas 512 and 513. Consequently, wireless device 522 may be instructed to utilize aggregated carriers 532 comprising carrier $F_2$ as the primary carrier since it offers a higher throughput, and carrier $F_3$ as the secondary carrier. As described herein, other combinations of secondary carriers may be utilized based on, for instance, a secondary usage. Further, a usage type of wireless device 523 is based on wireless device 523 being engaged in a VoIP session. Similar to wireless device 522, wireless device 523 is also located within coverage areas 512 and 513. However, in contrast to wireless device 522, wireless device 523 may be instructed to utilize aggregated carriers 533 comprising carrier $F_3$ as the primary carrier since it offers a larger coverage area, and carrier $F_2$ as the secondary carrier. As described herein, other combinations of secondary carriers may be utilized based on, for instance, a secondary usage.

Wireless devices 524 and 525 may be configured to act as relay nodes for wireless devices 544 and 545, respectively. Relay nodes improve service quality by relaying communication between a base station or donor access node 510, and an end-user wireless device. In some embodiments, relay wireless devices 524, 525 are referred to as a customer premise equipment (CPE), which includes any LTE wireless device having a stronger computational & RF capability versus standard wireless devices, as well as a directional antenna and a dedicated power supply, enabling relay wireless devices 524, 525 to efficiently provide resources to wireless devices 544, 545 respectively. Further, relay wireless devices 524, 525 may begin to function as relay nodes by sending a message to donor access node 510 to indicate to donor access node 510 that they are functioning as a relay node. In some embodiments, relay wireless devices 524, 525 can request to send a buffer status report to donor access node 510. Donor access node 510 can grant this request in a conventional manner. Relay wireless devices 524, 525 may respond to the grant by sending a short buffer status report. This short buffer status report is associated with a logical channel group that indicates the buffer status report is communicating the status of wireless devices 524, 525 as a relay, and thus is not asking for additional resource allocations (like a 'conventional' buffer status report would indicate). In other words, when relay wireless devices 524, 525 respond with a buffer status report for the 'special' logical channel group, it means that the buffer status report is not actually reporting the status of a buffer. Rather, this buffer status report indicates that the wireless device is now functioning as a relay. Once status of relay node is established, relay wireless devices 524, 525 may start accepting connection requests from one or more wireless devices such as wireless devices 544, 545.

In this exemplary embodiment, relay wireless device 524 is illustrated as being a mobile relay, while relay wireless device 525 is illustrated as being a stationary relay. Thus, relay wireless device 524 benefits from being attached to combined carriers 534 comprising carrier $F_2$ as a primary carrier and carrier $F_1$ as a secondary carrier, since carrier $F_2$ provides a greater coverage area which ensures uninterrupted service for wireless device 544 as relay wireless device 524 changes geographic location. On the other hand, stationary relay wireless device 525 benefits from being attached to combined carriers 535 comprising carrier $F_1$ as a primary carrier and carrier $F_2$ as a secondary carrier, since carrier $F_1$ provides a higher throughput which ensures higher QoS for one or more wireless devices such as wireless device 545. Further, the allocation of component carriers for each of wireless devices 521-525 may be adjusted based on other factors, such as a load on each carrier, a control channel load associated with each carrier, and other indicators useful to balance the wireless devices across the carriers.

Figure 6:
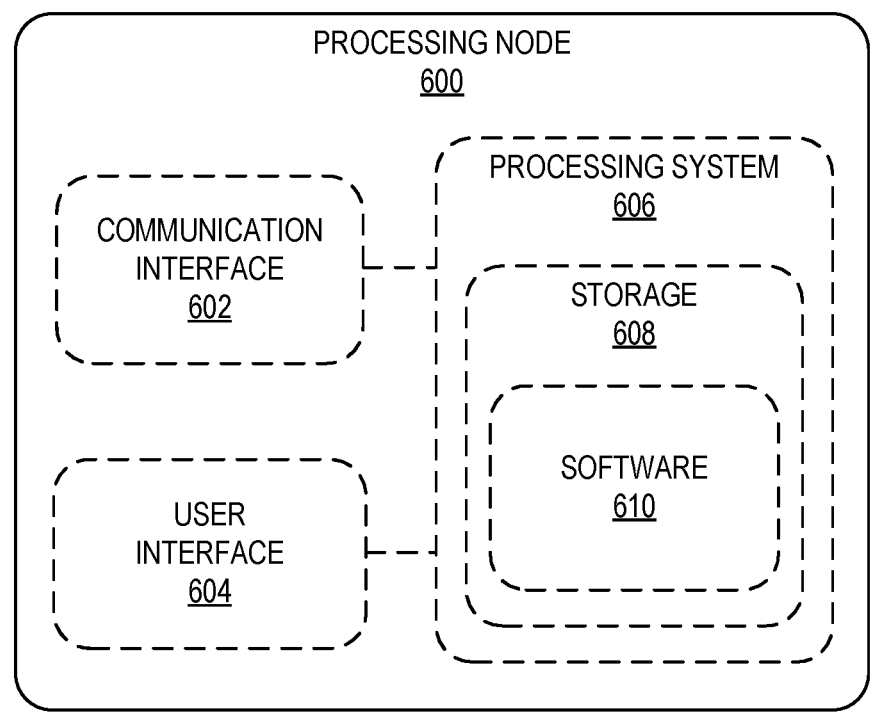
FIG. 6 depicts an exemplary processing node for selection of a primary carrier based on usage type.

FIG. 6 depicts an exemplary processing node for selection of a primary carrier based on usage type. The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, controller node 104, and/or network 101.

FIG. 6 depicts an exemplary processing node for performing carrier aggregation based on control channel load levels. Processing node 600 comprises a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a module for performing transmission power control operations described herein. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for performing carrier aggregation in a wireless network, the system comprising:
    a processing node; and
    a processor communicably coupled to the processing node, the processor for enabling the processing node to perform operations comprising:
        receiving an indicator from a wireless device connecting to the wireless network, the indicator providing characteristics of an application running on the wireless device;
        identifying a usage type of the application operating on the wireless device based on the received indicator;
        determining if the usage type is associated with one of high throughput and a large coverage area;
        correlating the usage type of the application with a carrier based on a characteristic of the carrier, wherein the carrier is selected from multiple available carriers including at least a first carrier utilizing a first frequency and having a large coverage area characteristic and a second carrier utilizing a second frequency and having a high throughput characteristic, wherein the first frequency is lower than the second frequency; and
        instructing the wireless device to operate in a carrier aggregation mode utilizing the carrier as a primary carrier.

2. The system of claim 1, further comprising an access node communicably coupled to the processing node, the access node being configured to deploy the carrier and at least one other carrier.

3. The system of claim 2, wherein the operations further comprise instructing the wireless device to operate in the carrier aggregation mode utilizing the at least one other carrier as a secondary carrier.

4. The system of claim 1, wherein the usage type associated with a high throughput includes at least one of a multimedia stream, a stationary relay, a low mobility, and a high quality of service (QoS) and the usage type associated with a high mobility includes at least one of a voice-over-IP (VoIP), a mobile relay, a high mobility, and a low quality of service (QoS).

5. The system of claim 1, wherein the indicator comprises an attach request.

6. The system of claim 1, wherein the indicator comprises an application identifier.

7. The system of claim 1, wherein the large coverage area is associated with the first frequency being below a threshold frequency.

8. The system of claim 1, wherein the high throughput is associated with the second frequency being above a threshold frequency.

9. The system of claim 1, wherein the first frequency is within a frequency band comprising a plurality of frequencies utilized by the first carrier and the second frequency is within another frequency band comprising a plurality of frequencies utilized by the second carrier.

10. A method for performing carrier aggregation in a wireless network, the method comprising:
    receiving an indicator from a wireless device connecting to the wireless network, the indicator providing characteristics of an application running on the wireless device;
    identifying a usage type of the application running on the wireless device based on the received indicator;
    determining if the usage type is associated with one of high throughput and a large coverage area;
    associating the usage type of the application on the wireless device with a carrier deployed by an access node in the wireless network, wherein the association is based on a frequency band utilized by the carrier, the frequency band corresponding to one of a large coverage area or a high throughput; and
    combining resources from the carrier with at least one other carrier for communications between the wireless device and the access node.

11. The method of claim 10, wherein the usage type comprises one or more of a voice-over-IP (VoIP), a mobile relay, a high mobility, or a low quality of service (QoS).

12. The method of claim 11, wherein the usage type is associated with a carrier utilizing a frequency band comprising frequencies that are below a threshold frequency.

13. The method of claim 10, wherein the usage type comprises one or more of a multimedia stream, a stationary relay, a low mobility, or a high quality of service (QoS).

14. The method of claim 13, wherein the usage type is associated with a carrier utilizing a frequency band comprising frequencies that are above a threshold frequency.

15. The method of claim 10, further comprising determining that the wireless device is acting as a relay for communication between the access node and a second wireless device communicatively coupled to the wireless device.

16. The method of claim 15, wherein the usage type is further of a second application on the second wireless device.

17. The method of claim 15, wherein the usage type is further based on a location of the wireless device.

18. A processing node for performing carrier aggregation in a wireless network, the processing node being configured to perform operations comprising:

receiving an indicator from a wireless device connecting to the wireless network, the indicator providing characteristics of an application running on the wireless device;

identifying a primary usage type of the application running on the wireless device based on the received indicator;

determining if the primary usage type is associated with one of high throughput and a large coverage area;

associating the primary usage type of the application running on the wireless device with a characteristic of a first carrier based on at least a first frequency band utilized by the first carrier, the frequency band corresponding to one of a large coverage area or a high throughput;

associating a secondary usage type of the application with a characteristic of a second carrier based on at least a second frequency band utilized by the second carrier;

assigning the first carrier as a primary carrier for the wireless device when operating in a carrier aggregation mode; and assigning the second carrier as a secondary carrier for the wireless device when operating in the carrier aggregation mode.

19. The processing node of claim 18, wherein both first and second frequency bands are non-contiguous, and wherein the carrier aggregation mode utilizes inter-band carrier aggregation.

* * * * *